US012581520B2

(12) United States Patent
Tsai et al.

(10) Patent No.: US 12,581,520 B2
(45) Date of Patent: Mar. 17, 2026

(54) UE CAPABILITY SIGNALING TO SUPPORT ENHANCEMENTS ON RESOURCE ALLOCATION FOR 5G NEW RADIO (NR) IN UNLICENSED SPECTRUM (NR-U)

(71) Applicant: MediaTek INC., Hsin-Chu (TW)

(72) Inventors: Chiou-Wei Tsai, Hsin-Chu (TW); Cheng-Rung Tsai, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 532 days.

(21) Appl. No.: 17/902,827

(22) Filed: Sep. 3, 2022

(65) Prior Publication Data

US 2023/0008553 A1 Jan. 12, 2023

Related U.S. Application Data

(63) Continuation of application No. PCT/CN2021/075457, filed on Feb. 5, 2021.

(Continued)

(51) Int. Cl.
*H04W 72/51* (2023.01)
*H04W 24/08* (2009.01)

(Continued)

(52) U.S. Cl.
CPC ........... *H04W 72/51* (2023.01); *H04W 24/08* (2013.01); *H04W 72/0453* (2013.01); *H04W 72/23* (2023.01)

(58) Field of Classification Search
CPC . H04W 72/51; H04W 24/08; H04W 72/0453; H04W 72/23; H04W 72/21;

(Continued)

(56) References Cited

U.S. PATENT DOCUMENTS

| | | | |
|---|---|---|---|
| 2019/0268971 A1 | 8/2019 | Talarico | |
| 2021/0266924 A1 | 8/2021 | Hong | ............... H04W 72/1205 |

(Continued)

FOREIGN PATENT DOCUMENTS

| | | |
|---|---|---|
| CN | 108781362 A | 11/2018 |
| CN | 109644491 A | 4/2019 |

(Continued)

OTHER PUBLICATIONS

European Intellectual Property Office Action 21750319.2.-1215., dated Mar. 7, 2024 (7 pages).

(Continued)

*Primary Examiner* — Dady Chery
(74) *Attorney, Agent, or Firm* — Helen Mao; Zheng Jin; Imperium Patent Works

(57) ABSTRACT

A method for UE capability signaling to support enhancements on resource allocation for Physical Downlink Control Channel (PDCCH) candidate monitoring in NR-U is proposed. A UE transfers UE capability information to a mobile communication network. The UE capability information includes information indicating whether the UE supports Control Resource Set (CORESET) configuration with a Resource Block (RB) offset. The UE receives resource allocation configuration of an unlicensed cell from the mobile communication network. The UE monitors PDCCH candidates on the unlicensed cell according to the resource allocation configuration.

14 Claims, 8 Drawing Sheets

Related U.S. Application Data

(60) Provisional application No. 63/000,539, filed on Mar. 27, 2020, provisional application No. 62/970,791, filed on Feb. 6, 2020.

(51) Int. Cl.
H04W 72/0453 (2023.01)
H04W 72/23 (2023.01)

(58) Field of Classification Search
CPC . H04L 5/0091; H04L 5/0094; H04L 27/0006; H04L 5/0053
See application file for complete search history.

(56) References Cited

U.S. PATENT DOCUMENTS

| | | | | |
|---|---|---|---|---|
| 2023/0030666 | A1* | 2/2023 | Park | H04W 76/27 |
| 2023/0199773 | A1* | 6/2023 | Cirik | H04L 1/1854 |
| | | | | 370/329 |

FOREIGN PATENT DOCUMENTS

| | | | |
|---|---|---|---|
| WO | WO2019050323 | A1 | 9/2017 |
| WO | WO2020005704 | A1 | 6/2018 |
| WO | 2019176593 | A1 | 9/2019 |

OTHER PUBLICATIONS

LG Electronics: "Summary Onwide-Band Operation for NR-U".

Sony: "Enhancements to Configured Grants INNR-U".

PCT Search Report and Written Opinion of PCT/CN2021/075457, mailed on Apr. 29, 2021 (9 pages).

China Intellectual Property Office Action 202180026498.7 Dated Apr. 30, 2025.

3GPP tsg_ran\wg1_rl1,tsgr1_99, LG Electronics,R1-1912394 "Summary on wide-band operation for NR-U".

3GPP tsg_ran\WG2_RL2, NTT Docomo, Inc. (Rapporteur), R2-1800217 "RAN WG's progress on NR WI in the Nov. meeting 2017".

3GPP tsg_ran\wg1_rl1,tsgr1_96b, Sony,R1-1904253 "Enhancements to Configured Grants in NR-U".

* cited by examiner

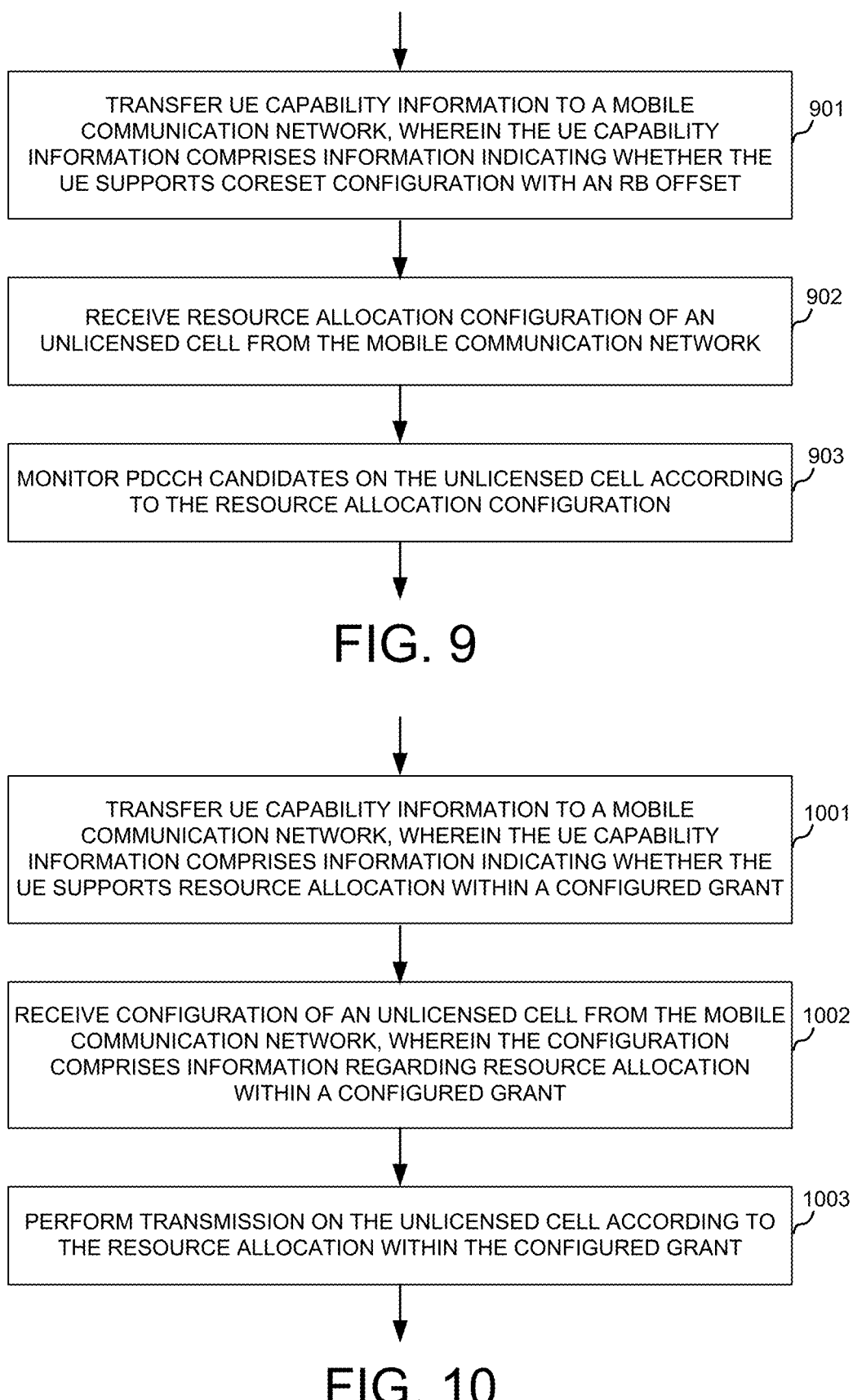

TRANSFER UE CAPABILITY INFORMATION TO A MOBILE COMMUNICATION NETWORK, WHEREIN THE UE CAPABILITY INFORMATION COMPRISES INFORMATION INDICATING WHETHER THE UE SUPPORTS CORESET CONFIGURATION WITH AN RB OFFSET — 901

RECEIVE RESOURCE ALLOCATION CONFIGURATION OF AN UNLICENSED CELL FROM THE MOBILE COMMUNICATION NETWORK — 902

MONITOR PDCCH CANDIDATES ON THE UNLICENSED CELL ACCORDING TO THE RESOURCE ALLOCATION CONFIGURATION — 903

FIG. 9

TRANSFER UE CAPABILITY INFORMATION TO A MOBILE COMMUNICATION NETWORK, WHEREIN THE UE CAPABILITY INFORMATION COMPRISES INFORMATION INDICATING WHETHER THE UE SUPPORTS RESOURCE ALLOCATION WITHIN A CONFIGURED GRANT — 1001

RECEIVE CONFIGURATION OF AN UNLICENSED CELL FROM THE MOBILE COMMUNICATION NETWORK, WHEREIN THE CONFIGURATION COMPRISES INFORMATION REGARDING RESOURCE ALLOCATION WITHIN A CONFIGURED GRANT — 1002

PERFORM TRANSMISSION ON THE UNLICENSED CELL ACCORDING TO THE RESOURCE ALLOCATION WITHIN THE CONFIGURED GRANT — 1003

FIG. 10

UE CAPABILITY SIGNALING TO SUPPORT ENHANCEMENTS ON RESOURCE ALLOCATION FOR 5G NEW RADIO (NR) IN UNLICENSED SPECTRUM (NR-U)

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/075457, with an international filing date of Feb. 5, 2021, which in turn claims priority from U.S. Provisional Application No. 62/970,791, filed on Feb. 6, 2020, and U.S. Provisional Application No. 63/000,539, filed on Mar. 27, 2020. This application is a continuation of International Application No. PCT/CN2021/075457, which claims priority from U.S. provisional applications 62/970,791 and 63/000,539. International Application No. PCT/CN2021/075457 is pending as of the filing date of this application, and the United States is a designated state in International Application No. PCT/CN2021/075457. The disclosure of each of the foregoing documents is incorporated herein by reference. the subject matter of which is incorporated herein by reference.

TECHNICAL FIELD

The disclosed embodiments relate generally to wireless communication, and, more particularly, to method for UE capability signaling to support enhancements on resource allocation for 5G New Radio (NR) in unlicensed spectrum (NR-U).

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an Evolved Universal Terrestrial Radio Access Network (E-UTRAN) includes a plurality of evolved Node-Bs (eNodeBs or eNBs) communicating with a plurality of mobile stations, referred to as User Equipments (UEs). The $3^{rd}$ Generation Partner Project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G New Radio (NR) systems.

In 3GPP release 16 specifications, support for 5G NR operating in unlicensed spectrum is introduced (such feature is also called NR-U) to bring to 5G a variety of options for flexibly utilizing the unlicensed spectrum. NR-U supports both license-assisted and standalone use of unlicensed spectrum. Specifically, standalone NR-U enables 5G to be deployed via small cell deployments and operated by any vertical end user without requiring licensed spectrum. This new feature will allow 5G NR to leverage the 5 GHz global band as well as the 6 Hz band, significantly increasing the spectrum reach of 5G.

With unlicensed operation, transmissions are subject to Listen-Before-Talk (LBT) which is a mechanism that requires the transmitting entity to sense the availability of an unlicensed channel before performing any transmission. The LBT requirement creates uncertainty for the channel availability, which is fundamentally different from the licensed-based access, where all the transmissions occur at prescheduled and fixed times. Accordingly, enhancements on resource allocation, including Control Resource Set (CORESET) and Physical Uplink Shared Channel (PUSCH) allocations, may be required. However, these enhancements are not always required depending on which regions the User Equipment (UEs) are used. Moreover, these enhancements may require additional UE implementation efforts. Hence, it is desirable to have a flexible way for the UEs to support these enhancements for NR-U.

SUMMARY

A method for UE capability signaling to support enhancements on resource allocation for Physical Downlink Control Channel (PDCCH) candidate monitoring in NR-U is proposed. A UE transfers UE capability information to a mobile communication network, wherein the UE capability information comprises information indicating whether the UE supports Control Resource Set (CORESET) configuration with a Resource Block (RB) offset. The UE receives resource allocation configuration of an unlicensed cell from the mobile communication network. The UE monitors PDCCH candidates on the unlicensed cell according to the resource allocation configuration.

In one embodiment, the resource allocation configuration comprises information regarding frequency domain resource allocation of a CORESET with an RB offset. The monitoring of PDCCH candidates on the unlicensed cell comprises: aligning a starting position of the allocated frequency domain resource of the CORESET with a first RB of a first RB set in a Downlink (DL) Bandwidth Part (BWP) based on the RB offset.

In one embodiment, the UE capability information further comprises information indicating a number of monitoring occasions for a Search Space Set (SSS) that the UE is capable of monitoring in frequency domain. The resource allocation configuration comprises information regarding frequency domain resource allocation of an SSS with one or more monitoring occasions. The monitoring of PDCCH candidates on the unlicensed cell comprises: replicating a frequency domain resource allocation pattern for each of the monitoring occasions based on a frequency domain resource allocation pattern of a CORESET with which the SSS is associated.

In one embodiment, the UE capability information is set per frequency band by the UE.

A method for UE capability signaling to support enhancements on resource allocation for Uplink (UL) grant-free Transmission (Tx) in NR-U is proposed. A UE transfers UE capability information to a mobile communication network by a UE, wherein the UE capability information comprises information indicating whether the UE supports resource allocation within a configured grant in unlicensed spectrum. The UE receives configuration of an unlicensed cell from the mobile communication network by the UE, wherein the configuration comprises information regarding resource allocation within a configured grant. The UE performs transmission on the unlicensed cell according to the resource allocation within the configured grant.

In one embodiment, the UE capability information comprises a first indicator of whether the UE supports transmission on configured grants in unlicensed spectrum, a second indicator of whether the UE supports a number of consecutive slots allocated for the configured grant in unlicensed spectrum, and/or a third indicator of whether the UE supports a number of Physical Uplink Shared Channel (PUSCH) allocations within the slots for the configured grant in unlicensed spectrum.

In one embodiment, the configured grant is a type-1 configured UL grant or a type-2 configured UL grant in response to the mobile communication network being a 5G New Radio (NR) network supporting unlicensed spectrum.

In one embodiment, the UE capability information is set per frequency band by the UE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a flow chart of a method for UE capability signaling to support enhancements on resource allocation for PDCCH candidate monitoring in accordance with one novel aspect.

FIG. 10 is a flow chart of a method for UE capability signaling to support enhancements on resource allocation for UL grant-free Tx in accordance with one novel aspect.

DETAILED DESCRIPTION

Reference will now be made in detail to some embodiments of the invention, examples of which are illustrated in the accompanying drawings.

Figure 1:
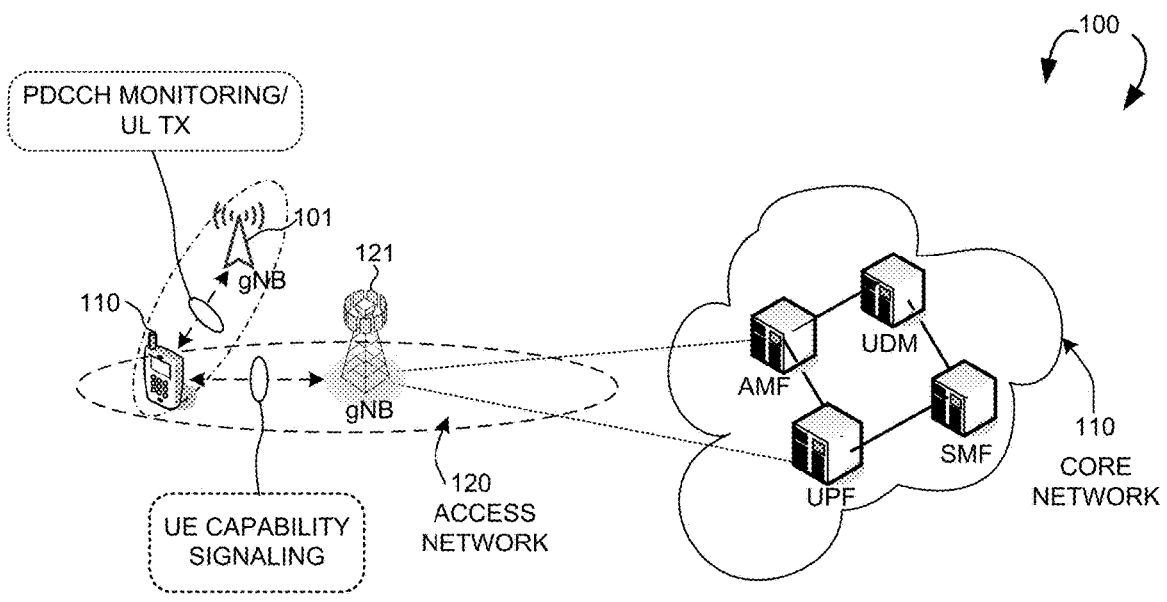
FIG. 1 illustrates an exemplary 5G new radio (NR) network 100 supporting unlicensed spectrum in accordance with one novel aspect.

FIG. 1 illustrates an exemplary 5G new radio (NR) network 100 supporting unlicensed spectrum in accordance with one novel aspect. 5G NR network 100 comprises a user equipment (UE) 110 communicatively connected to a gNB

121 operating in a licensed band (e.g., 30 GHz~300 GHz for mmWave) of an access network 120. The access network 120 is connected to a 5G core network 130 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy.

In addition to the gNB 121, the UE 110 is surrounded by one or more gNBs, including the gNB 101, which operate in an unlicensed band (e.g., 5 GHz or 6 GHz). The gNB 101 may be deployed by the same operator of the gNB 121, or may be deployed by a different operator than the operator of the gNB 121. The gNB 121 may form at least one cell which may be referred to as an NR-based licensed cell (i.e., a cell operating in a 5G NR licensed band). Similarly, the gNB 101 may form at least one cell which may be referred to as an NR-based unlicensed cell (i.e., a cell operating in an unlicensed band).

The UE 110 may be a smart phone, a wearable device, an Internet of Things (IoT) device, and a tablet, etc., and may or may not support enhanced resource allocation of an unlicensed cell.

In accordance with one novel aspect, if the UE 110 camps on the cell (e.g., a PCell or PSCell) formed by the gNB 121, the UE 110 may transfer its UE capability information regarding whether it supports enhanced resource allocation of an unlicensed cell to the serving cell during a UE capability transfer procedure. After that, the gNB 121 may provide the UE 110 with resource allocation configuration of the unlicensed cell, and the UE 110 may perform Physical Downlink Control Channel (PDCCH) candidate monitoring or uplink transmission on the unlicensed cell according to the received resource allocation configuration.

In one embodiment, the UE capability information comprises information indicating whether the UE 110 supports Control Resource Set (CORESET) configuration with a Resource Block (RB) offset. If the reported UE capability information indicates that the UE 110 supports CORESET configuration with an RB offset, the resource allocation configuration received from the gNB 121 may comprise information regarding frequency domain resource allocation of a CORESET with an RB offset. Accordingly, the UE 110 may monitor PDCCH candidates, by aligning the starting position of the allocated frequency domain resource of the CORESET with a first RB of a first RB set in a Downlink (DL) Bandwidth Part (BWP) based on the RB offset, to avoid resource wastage.

In another embodiment, the UE capability information comprises information indicating a number (e.g., from 1 to 5) of monitoring occasions for a Search Space Set (SSS) that the UE is capable of monitoring in the frequency domain. If the reported UE capability information includes this information, the resource allocation configuration may comprise a bitmap in which each bit indicates whether a monitoring occasion is present in a respective RB set in a DL BWP. For example, the bitmap may be provided by a "freqMonitorLocations-r16" Information Element (IE) in an SSS configured in a DL BWP. Accordingly, the UE 110 may monitor PDCCH candidates, by replicating a frequency domain resource allocation pattern for each of the monitoring occasions based on a frequency domain resource allocation pattern of a CORESET with which the SSS is associated.

In another embodiment, the UE capability information comprises information indicating whether the UE 110 supports transmission on configured grants in unlicensed spectrum, and information indicating whether the UE 110 supports resource allocation within a configured grant in unlicensed spectrum. For example, the UE capability information may comprise a first indicator of whether the UE 110 supports transmission on configured grants in unlicensed spectrum, a second indicator of whether the UE 110 supports a number of consecutive slots allocated for a configured grant in unlicensed spectrum (e.g., a type-1 configured Uplink (UL) grant or a type-2 configured UL grant defined in 5G NR), and/or a third indicator of whether the UE 110 supports a number of Physical Uplink Shared Channel (PUSCH) allocations within the slots for a configured grant in unlicensed spectrum. If the reported UE capability information indicates that the UE 110 supports resource allocation within a configured grant in unlicensed spectrum, the resource allocation configuration may comprise information regarding resource allocation within a configured grant. For example, the resource allocation configuration may comprise a "cg-nrofSlots-r16" IE to indicate the number of consecutive slots allocated for a configured grant on an unlicensed cell, and/or a "cg-nrofPUSCH-InSlot-r16" IE to indicate the number of PUSCH allocations within the slots for a configured grant on an unlicensed cell. Accordingly, the UE 110 may perform transmission on the unlicensed cell according to the resource allocation of the configured grant.

Figure 2:
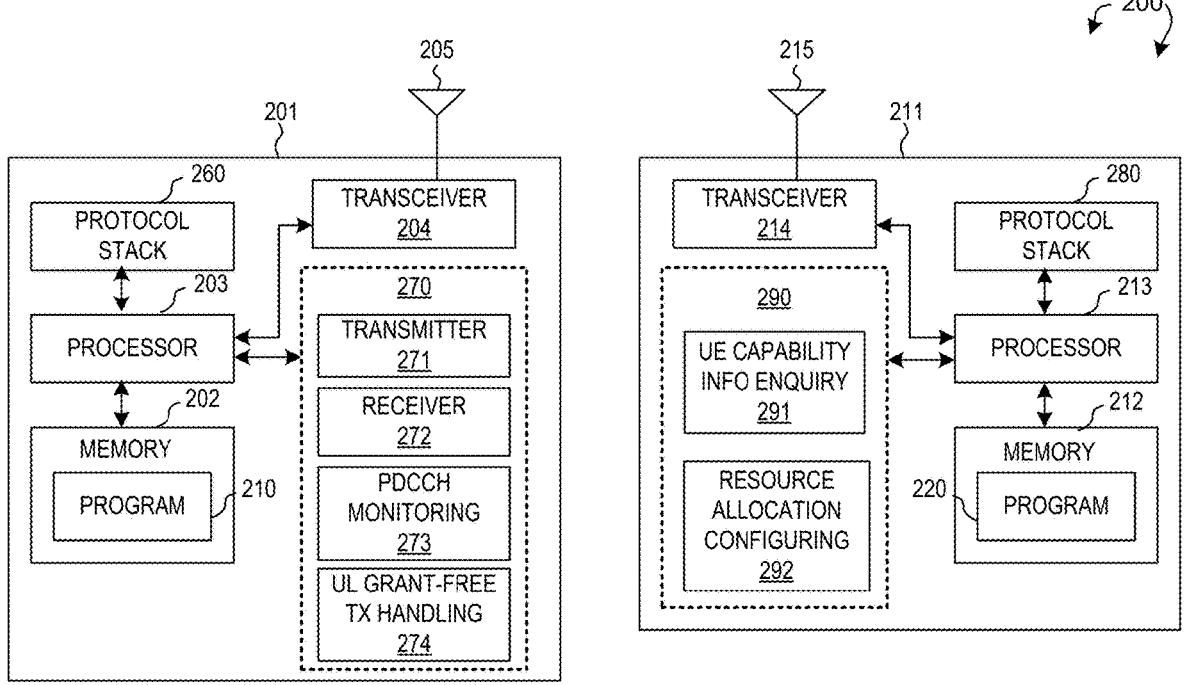
FIG. 2 illustrates simplified block diagrams of wireless devices in accordance with embodiments of the current invention.

FIG. 2 illustrates simplified block diagrams of wireless devices, e.g., a UE 201 and a gNB 211 in accordance with embodiments of the current invention. The gNB 211 has an antenna 215, which transmits and receives radio signals. A radio frequency RF transceiver module 214, coupled with the antenna 215, receives RF signals from the antenna 215, converts them to baseband signals and sends them to the processor 213. The RF transceiver 214 also converts received baseband signals from the processor 213, converts them to RF signals, and sends out to the antenna 215. The processor 213 processes the received baseband signals and invokes different functional modules to perform features in the gNB 211. The memory 212 stores program instructions and data 220 to control the operations of the gNB 211. In the example of FIG. 2, the gNB 211 also includes a protocol stack 280 and a set of control function modules and circuits 290. The protocol stack 280 may include a Non-Access-Stratum (NAS) layer to communicate with an AMF/SMF/MME entity connecting to the core network, a Radio Resource Control (RRC) layer for high layer configuration and control, a Packet Data Convergence Protocol/Radio Link Control (PDCP/RLC) layer, a Media Access Control (MAC) layer, and a Physical (PHY) layer. In one example, the control function modules and circuits 290 include a UE capability information enquiry circuit 291 that enquires the UE capability information of the UE 201, and a resource allocation configuring circuit 292 that prepares the configuration of resource allocation (e.g., CORESET configuration with an RB offset, and/or detailed resource allocation within a configured grant) for unlicensed cell(s).

Similarly, the UE 201 has a memory 202, a processor 203, and a radio frequency (RF) transceiver module 204. The RF transceiver 204 is coupled with the antenna 205, receives RF signals from the antenna 205, converts them to baseband signals, and sends them to the processor 203. The RF transceiver 204 also converts received baseband signals from the processor 203, converts them to RF signals, and sends out to the antenna 205. The processor 203 processes the received baseband signals and invokes different functional modules and circuits to perform features in the UE 201. The memory 202 stores data and program instructions 210 to be executed by the processor 203 to control the operations of the UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of the UE 201.

The UE 201 also includes a protocol stack 260 and a set of control function modules and circuits 270. The protocol stack 260 may include a NAS layer to communicate with an AMF/SMF/MME entity connecting to the core network, an RRC layer for high layer configuration and control, a PDCP/RLC layer, a MAC layer, and a PHY layer. The Control function modules and circuits 270 may be implemented and configured by software, firmware, hardware, and/or combination thereof. The control function modules and circuits 270, when executed by the processor 203 via program instructions contained in the memory 202, interwork with each other to allow the UE 201 to perform embodiments and functional tasks and features in the network.

In one example, the control function modules and circuits 270 include a transmitter circuit 271 that transfers the information of the UE capability regarding whether the UE 201 supports enhanced resource allocation of an unlicensed cell to the gNB 211, a receiver circuit 272 that receives resource allocation configuration of an unlicensed cell from the gNB 211, a PDCCH monitoring circuit 273 that monitors PDCCH candidates on an unlicensed cell according to the received resource allocation configuration, and an UL grant-free Transmission (Tx) handling circuit 274 that performs transmission on the configured grant to the unlicensed cell according to the received resource allocation configuration.

Figure 3:
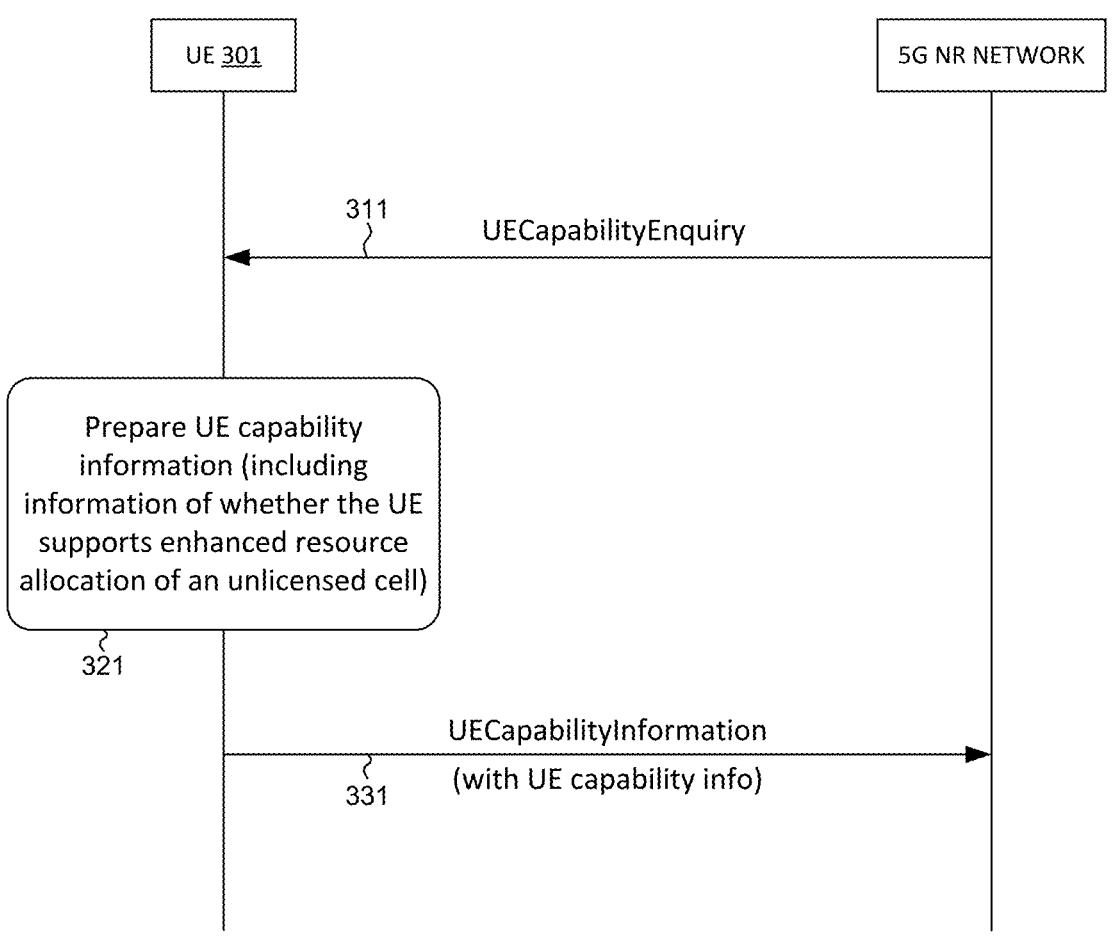
FIG. 3 illustrates a sequence flow between a UE 301 and a 5G NR network for UE capability signaling to support enhancements on resource allocation for NR-U in accordance with one novel aspect.

FIG. 3 illustrates a sequence flow between a UE 301 and a 5G NR network for UE capability signaling to support enhancements on resource allocation for NR-U in accordance with one novel aspect. In step 311, the UE 301 receives a UECapabilityEnquiry message from the 5G NR network. The 5G NR network may initiate this procedure to a UE in RRC_CONNECTED when it needs (additional) UE radio access capability information. The 5G NR network should retrieve UE capabilities only after AS security activation. In step 321, the UE 301 prepares the UE capability information including the information of whether it supports enhanced resource allocation of an unlicensed cell. Specifically, the UE capability information may include one or more of the following information: 1) the information indicating whether the UE supports CORESET configuration with an RB offset; 2) the information indicating a number of monitoring occasions for an SSS that the UE is capable of monitoring in the frequency domain; and 3) the information indicating whether the UE supports resource allocation within a configured grant. In step 331, the UE 301 sends a UECapabilityInformation message including the UE capability information to the 5G NR network.

Figure 4:
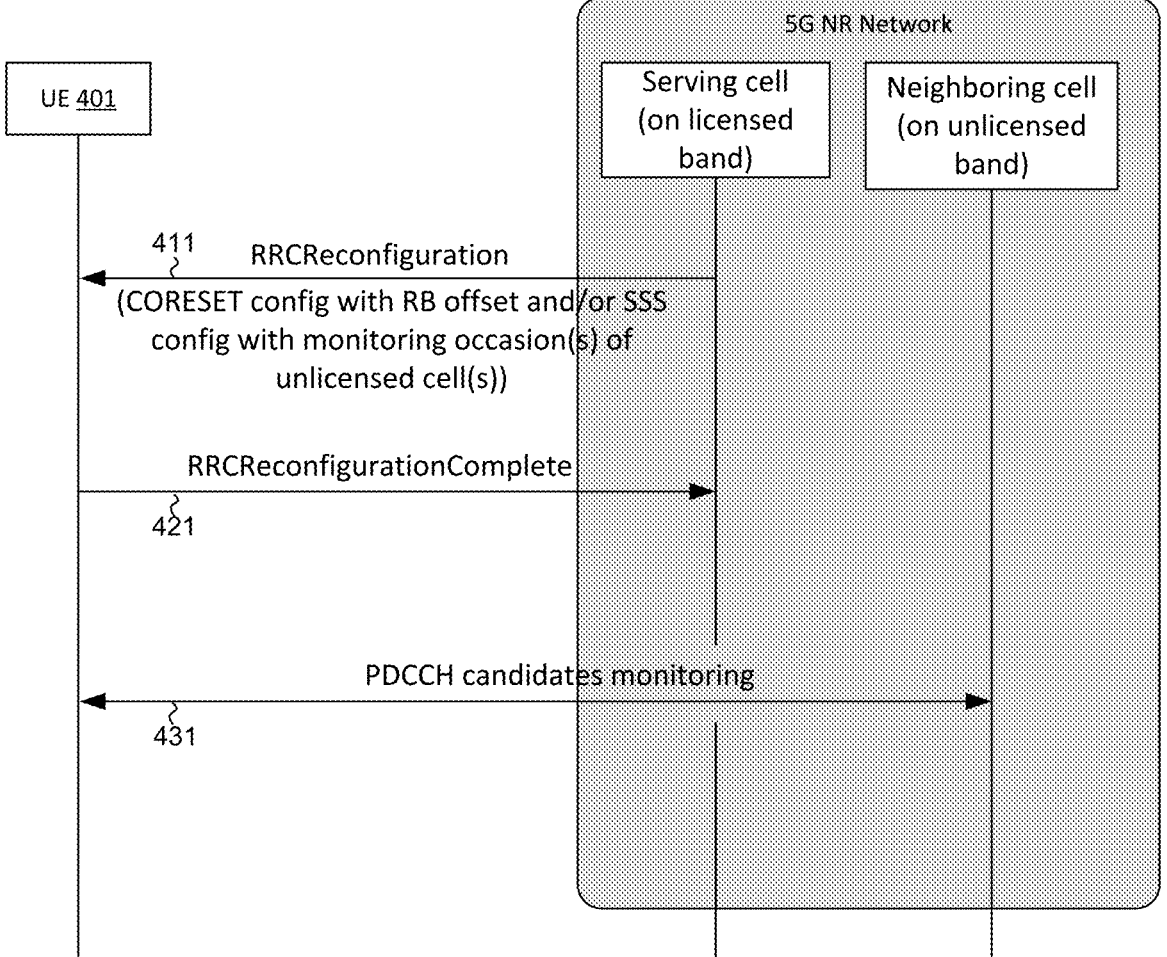
FIG. 4 illustrates a sequence flow between a UE 401 and a 5G NR network for enabling PDCCH candidates monitoring on an unlicensed cell in accordance with one novel aspect.

FIG. 4 illustrates a sequence flow between a UE 401 and a 5G NR network for enabling PDCCH candidates monitoring on an unlicensed cell in accordance with one novel aspect. In step 411, the UE 401 receives an RRCReconfiguration message with resource allocation configuration of an unlicensed cell from the 5G NR network. Specifically, the resource allocation configuration includes CORESET configuration with an RB offset and/or SSS configuration with monitoring occasion(s). To further clarify, the CORESET configuration may include information regarding frequency domain resource allocation of a CORESET with an RB offset (e.g., provided by a "rb_Offset-r16" IE in the CORESET configuration), and the SSS configuration may include a bitmap (e.g., provided by a "freqMonitorLocations-r16" IE in the SSS configuration) in which each bit indicates whether a monitoring occasion is present in a respective RB set in a DL BWP. In step 421, the UE 401 sends an RRCReconfigurationComplete message to the 5G NR network. In step 431, the UE 401 monitors PDCCH candidates on the unlicensed cell according to the received resource allocation configuration. Specifically, the monitoring of PDCCH candidates on the unlicensed cell is performed by aligning a starting position of the allocated frequency domain resource of the CORESET with a first RB of a first RB set in a DL BWP based on the RB offset, and/or by replicating a frequency domain resource allocation pattern for each of the monitoring occasions based on a frequency domain resource allocation pattern of a CORESET with which the SSS is associated.

Figure 5:
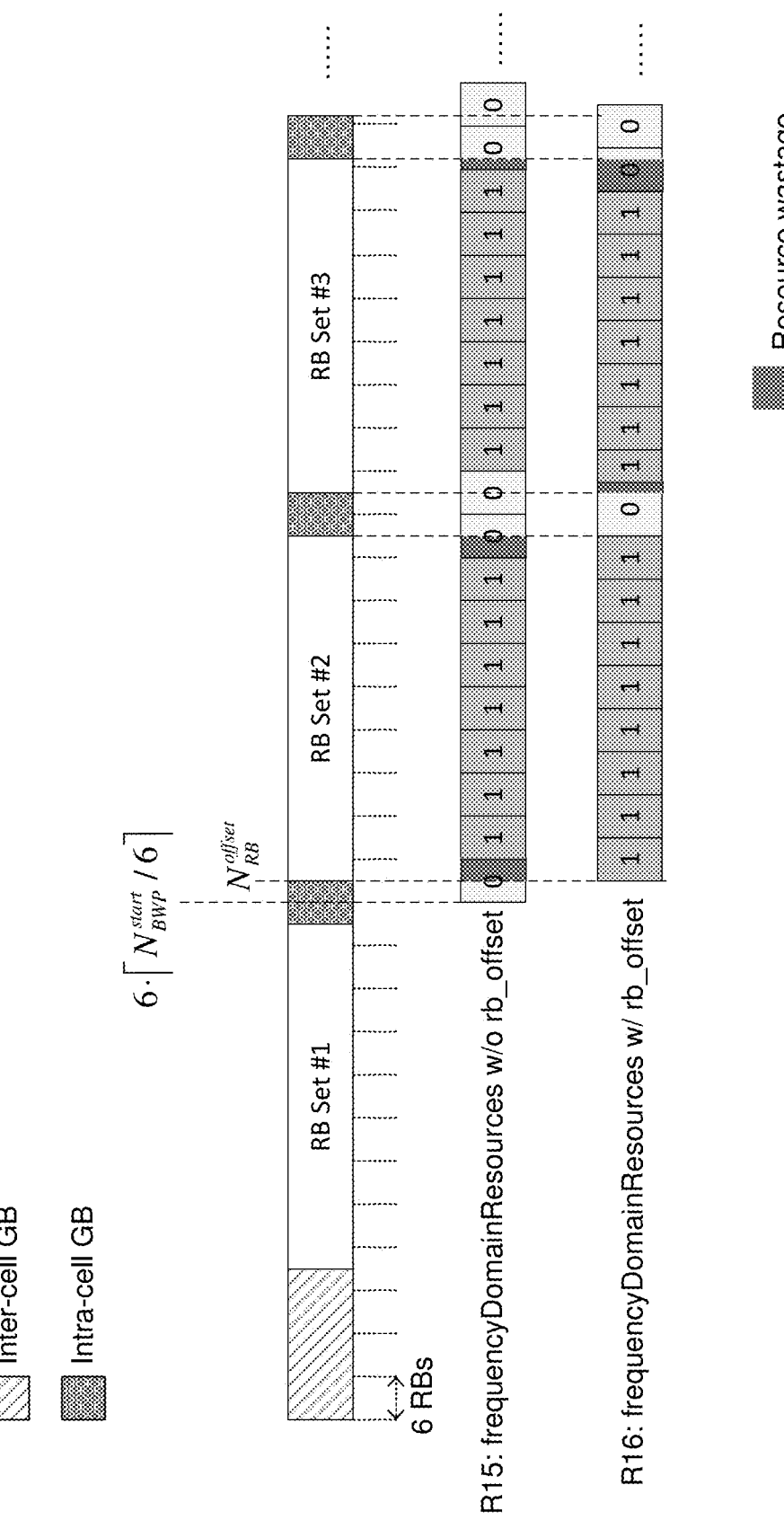
FIG. 5 illustrates the frequency domain resource allocation of a CORESET with an RB offset in accordance with one novel aspect.

FIG. 5 illustrates the frequency domain resource allocation of a CORESET with an RB offset in accordance with one novel aspect. With the RB offset, the first Carrier Resource Block (CRB) of the first RB group corresponding to the first bit if the respective frequnecyDomainResources has CRB index $$N_{BWP}^{start} + N_{RB}^{offset}$$

instead of $$6 \cdot \lceil N_{BWP}^{start} / 6 \rceil .$$

The starting position of frequencyDomainResources is aligned with the first RB of the first RB set in the DL BWP to avoid resource wastage. However, for the later RB set(s) in the DL BWP, resource wastage may still exist.

Figure 6:
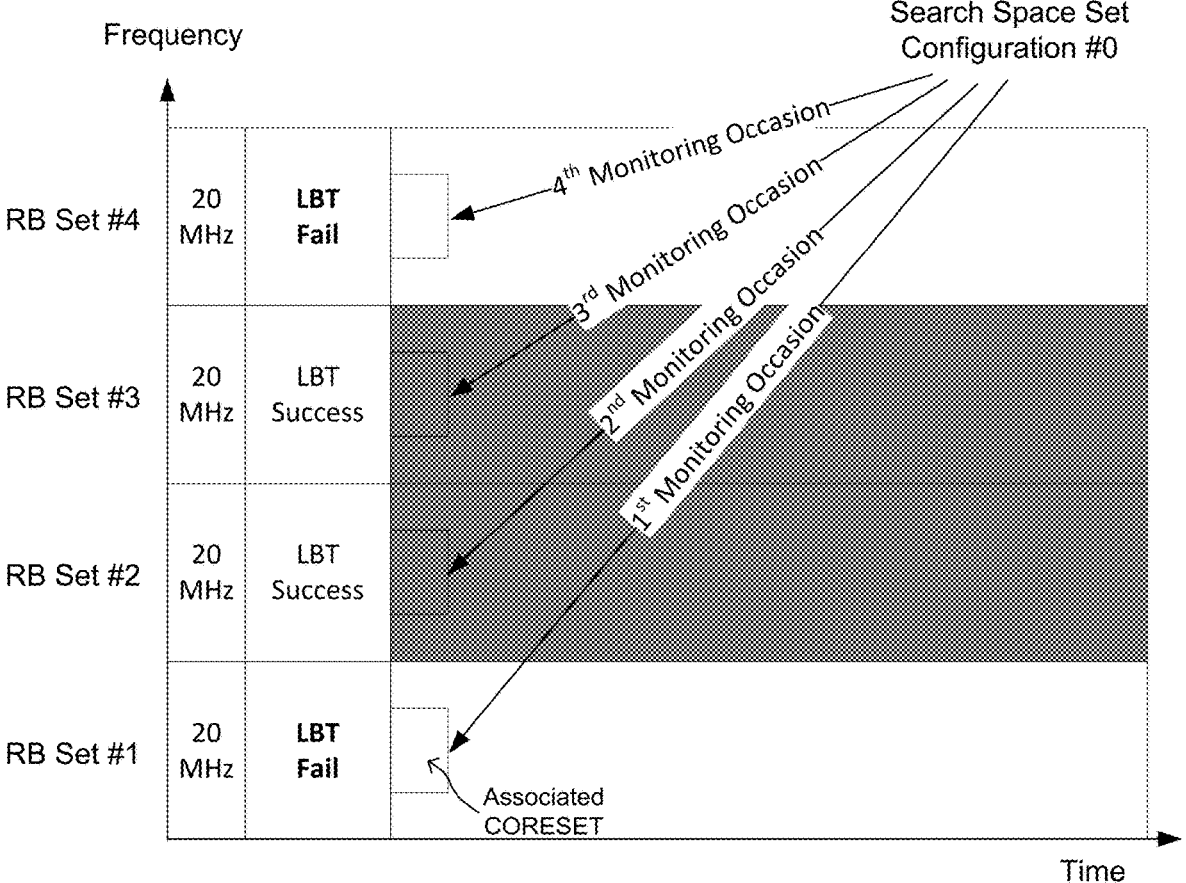
FIG. 6 illustrates the monitoring occasions in an SSS in accordance with one novel aspect.

FIG. 6 illustrates the monitoring occasions in an SSS in accordance with one novel aspect. To increase transmission opportunities for a CORESET confined within a LBT bandwidth in a DL BWP of a wideband carrier, replication of the CORESET in more than one LBT bandwidths in the DL BWP is beneficial. In this example, there are four RB sets (denoted as RB Set #1 to RB Set #4), each of which is in a 20 MHz LBT sub-band, and the associated CORESET is in RB Set #1. The SSS configuration associated with the CORESET can have one or more monitoring occasions/locations in different LBT bandwidths. In this example, there are four monitoring occasions/locations in four different 20 MHz LBT bandwidths. Each monitoring occasion/location has a frequency domain resource allocation pattern that is replicated from the pattern configured in the associated CORESET, and the CORESET parameters other than frequency domain resource allocation pattern are identical for each monitoring occasion/location.

Figure 7:
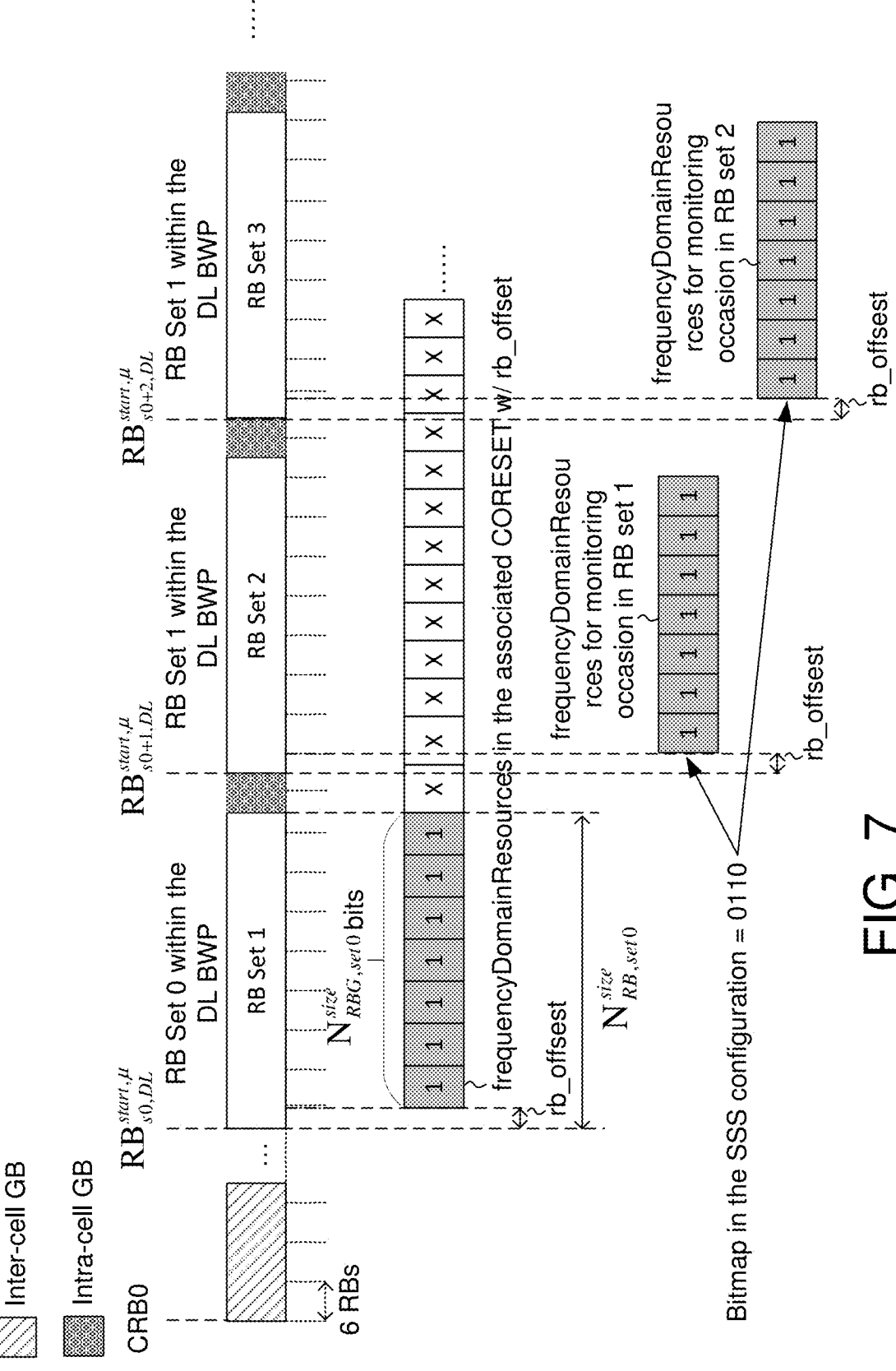
FIG. 7 illustrates the replication of frequency domain resource allocation pattern to each monitoring occasion in an SSS in accordance with one novel aspect.

FIG. 7 illustrates the replication of frequency domain resource allocation pattern to each monitoring occasion in an SSS in accordance with one novel aspect. The "freqMonitorLocations-r16" IE in the SSS configuration may provide a bitmap in which each bit indicates whether a monitoring occasion is present in a respective RB set in a DL BWP. Specifically, the first Most Significant Bit (MSB) bit in the bitmap indicates whether a monitoring occasion/location is present in the RB set 0 in the DL BWP, the second MSB bit indicates whether a monitoring occasion/location is present in the RB set 1 in the DL BWP, and so on. For the RB set k within the DL BWP provided with a monitoring occasion/location, the first Physical RB (PRB) of the monitoring occasion/location confined within the RB set k is aligned with $$RB_{s0+k,DL}^{start,\mu} + N_{RB}^{offset},$$

where $$RB_{s0+k,DL}^{start,\mu}$$

is the common RB index of the first PRB of the RB set k. The frequency domain resource allocation pattern for each monitoring occasion/location is determined based on the first $$N_{RBG,set0}^{size}$$

bits in frequencyDomainResources provided by the associated CORESET, wherein $$N_{RBG,set0}^{size} = \lfloor (N_{RB,set0}^{size} - N_{RB}^{offset}) / 6 \rfloor$$

with $$N_{RB,set0}^{size}$$

being the number of PRBs in the RB set 0 for the DL BWP.

In a case where a CORESET is not associated with any SSS configured with freqMonitorLocation-r16, if rb_offset is not provided in the CORESET, the first CRB of the first RB group in the respective frequencyDomainResources has CRB index $$6 \cdot \lceil N_{BWP}^{start} / 6 \rceil .$$

Otherwise, if rb_offset is provided in the CORESET, the first CRB of the first RB group in the respective frequencyDomainResources has CRB index $$N_{BWP}^{start} + N_{RB}^{offset} .$$

In a case where a CORESET is associated with at least one SSS configured with freqMonitorLocation-r16, the UE only uses the first $$N_{RBG,set0}^{size}$$

bits of respective frequencyDomainResources. Whether the "rb_Offset-r16" IE is provided in the CORESET configuration or not, the first CRB pf the first RB group corresponding to the first bit of respective frequencyDomainResources has CRB index $$RB_{s0+k,DL}^{start,\mu} + N_{RB}^{offset},$$

wherein k is indicated by the "freqMonitoringLocations-r16" IE if provided for an SSS (otherwise, k=0), and $$N_{RB}^{offset}$$

is provided by the "rb_Offset-r16" IE if provided for the CORESET (otherwise, $$N_{RB}^{offset} = 0$$

Figure 8:
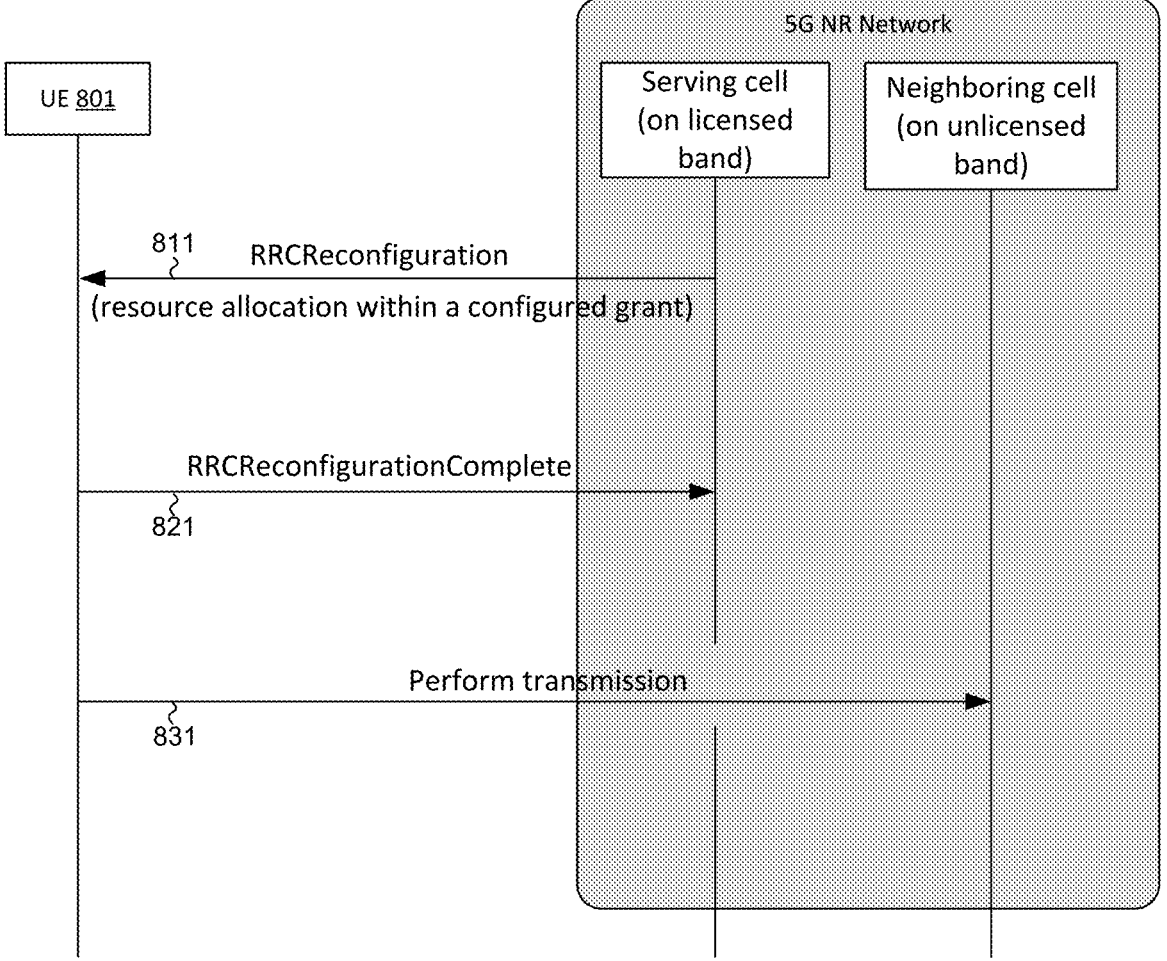
FIG. 8 illustrates a sequence flow between a UE 801 and a 5G NR network for enabling UL grant-free transmission on an unlicensed cell in accordance with one novel aspect.

FIG. 8 illustrates a sequence flow between a UE 801 and a 5G NR network for enabling UL grant-free transmission on an unlicensed cell in accordance with one novel aspect. In step 811, the UE 801 receives an RRCReconfiguration message with resource allocation configuration of an unlicensed cell from the 5G NR network. Specifically, the resource allocation configuration includes resource allocation within a configured grant (e.g., a type-1 configured UL grant or a type-2 configured UL grant defined in 5G NR) in unlicensed spectrum. For example, the resource allocation configuration may include information (e.g., a "cg-nrofSlots-r16" IE) indicating a number of consecutive slots allocated for the configured grant on an unlicensed cell, and/or information (e.g., a "cg-nrofPUSCH-InSlot-r16" IE) indicating the number of PUSCH allocations within the slots for a configured grant on an unlicensed cell. In step 821, the UE 801 sends an RRCReconfigurationComplete message to the 5G NR network. In step 831, the UE 801 performs transmission on the unlicensed cell according to the resource allocation within the configured grant. That is, the transmission is performed using the PUSCH allocations within the indicated number of slots within the configured grant.

FIG. 9 is a flow chart of a method for UE capability signaling to support enhancements on resource allocation for PDCCH candidate monitoring in accordance with one novel aspect. In step 901, a UE transfers its UE capability information to a mobile communication network, wherein the UE capability information comprises information indicating whether the UE supports CORESET configuration with an RB offset. In step 902, the UE receives resource allocation configuration of an unlicensed cell from the mobile communication network. The resource allocation configuration may include information regarding frequency domain resource allocation of a CORESET with an RB offset. In step 903, the UE monitors PDCCH candidates on the unlicensed cell according to the resource allocation configuration.

In one embodiment, the step of monitoring PDCCH candidates on the unlicensed cell may comprise: aligning a starting position of the allocated frequency domain resource of the CORESET with a first RB of a first RB set in a DL BWP based on the RB offset.

In another embodiment, the UE capability information further comprises information indicating a number of monitoring occasions for an SSS that the UE is capable of monitoring in frequency domain, and the resource allocation configuration comprises information regarding frequency domain resource allocation of an SSS with one or more monitoring occasions. The step of monitoring PDCCH candidates on the unlicensed cell may comprise: replicating a frequency domain resource allocation pattern for each of the monitoring occasions based on a frequency domain resource allocation pattern of a CORESET with which the SSS is associated.

In one example, the UE capability information is set per frequency band by the UE.

FIG. 10 is a flow chart of a method for UE capability signaling to support enhancements on resource allocation for UL grant-free Tx in accordance with one novel aspect. In step 1001, a UE transfers its UE capability information to a mobile communication network, wherein the UE capability information comprises information indicating whether the UE supports resource allocation within a configured grant in unlicensed spectrum. In step 1002, the UE receives configuration of an unlicensed cell from the mobile communication network, wherein the configuration comprises information regarding resource allocation within a configured grant. In step 1003, the UE performs transmission on the unlicensed cell according to the resource allocation within the configured grant.

In one embodiment, the UE capability information comprises a first indicator of whether the UE supports transmission on configured grants in unlicensed spectrum, a second indicator of whether the UE supports a number of consecutive slots allocated for the configured grant in unlicensed spectrum, and a third indicator of whether the UE supports a number of PUSCH allocations within the slots for the configured grant in unlicensed spectrum.

In one example, the configured grant is a type-1 configured UL grant or a type-2 configured UL grant in response to the mobile communication network being a 5G NR network supporting unlicensed spectrum.

In one example, the UE capability information is set per frequency band by the UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   transferring User Equipment (UE) capability information to a mobile communication network by a UE, wherein the UE capability information comprises information indicating whether the UE supports Control Resource Set (CORESET) configuration with a Resource Block (RB) offset;
   receiving resource allocation configuration of an unlicensed cell from the mobile communication network by the UE, wherein the resource allocation configuration comprises information regarding frequency domain resource allocation of a CORESET with an RB offset; and
   monitoring Physical Downlink Control Channel (PDCCH) candidates on the unlicensed cell according to the resource allocation configuration by the UE, and determining a starting position of the allocated frequency domain resource of the CORESET based on the RB offset.

2. The method of claim 1, wherein the UE capability information further comprises information indicating a number of monitoring occasions for a Search Space Set (SSS) that the UE is capable of monitoring in frequency domain.

3. The method of claim 2, wherein the resource allocation configuration comprises information regarding frequency domain resource allocation of an SSS with one or more monitoring occasions.

4. The method of claim 3, wherein the monitoring of PDCCH candidates on the unlicensed cell comprises:
replicating a frequency domain resource allocation pattern for each of the monitoring occasions based on a frequency domain resource allocation pattern of a CORESET with which the SSS is associated.

5. The method of claim 1, wherein the UE capability information is set per frequency band by the UE.

6. A User Equipment (UE), comprising:
a transmitter that transfers UE capability information to a mobile communication network, wherein the UE capability information comprises information indicating whether the UE supports Control Resource Set (CORESET) configuration with a Resource Block (RB) offset;
a receiver that receives resource allocation configuration of an unlicensed cell from the mobile communication network, wherein the resource allocation configuration comprises information regarding frequency domain resource allocation of a CORESET with an RB offset; and
a monitoring circuit that monitors Physical Downlink Control Channel (PDCCH) candidates on the unlicensed cell according to the resource allocation configuration, and determining a starting position of the allocated frequency domain resource of the CORESET based on the RB offset.

7. The UE of claim 6, wherein the UE capability information further comprises information indicating a number of monitoring occasions for an SSS that the UE is capable of monitoring in frequency domain.

8. The UE of claim 7, wherein the resource allocation configuration comprises information regarding frequency domain resource allocation of an SSS with one or more monitoring occasions.

9. The UE of claim 8, wherein the monitoring of PDCCH candidates on the unlicensed cell involves replicating a frequency domain resource allocation pattern for each of the monitoring occasions based on a frequency domain resource allocation pattern of a CORESET with which the SSS is associated.

10. The UE of claim 6, wherein the UE capability information is set per frequency band by the UE.

11. A method, comprising:
transferring User Equipment (UE) capability information to a mobile communication network by a UE, wherein the UE capability information comprises information indicating whether the UE supports resource allocation within a configured grant in unlicensed spectrum;
receiving configuration of an unlicensed cell from the mobile communication network by the UE, wherein the configuration comprises information regarding resource allocation within a configured grant;
wherein the UE capability information comprises a first indicator of whether the UE supports transmission on configured grants in unlicensed spectrum;
wherein the UE capability information comprises a second indicator of whether the UE supports a number of consecutive slots allocated for the configured grant in unlicensed spectrum; and
performing transmission on the unlicensed cell according to resource allocation within the configured grant by the UE.

12. The method of claim 11, wherein the UE capability information comprises a third indicator of whether the UE supports a number of Physical Uplink Shared Channel (PUSCH) allocations within the slots for the configured grant in unlicensed spectrum.

13. The method of claim 11, wherein the configured grant is a type-1 configured Uplink (UL) grant or a type-2 configured UL grant in response to the mobile communication network being a 5G New Radio (NR) network supporting unlicensed spectrum.

14. The method of claim 11, wherein the UE capability information is set per frequency band by the UE.

* * * * *